March 20, 1934.　　A. O. McCOLLUM　　1,951,702
CONTROL DEVICE
Filed Nov. 25, 1932　　2 Sheets-Sheet 1
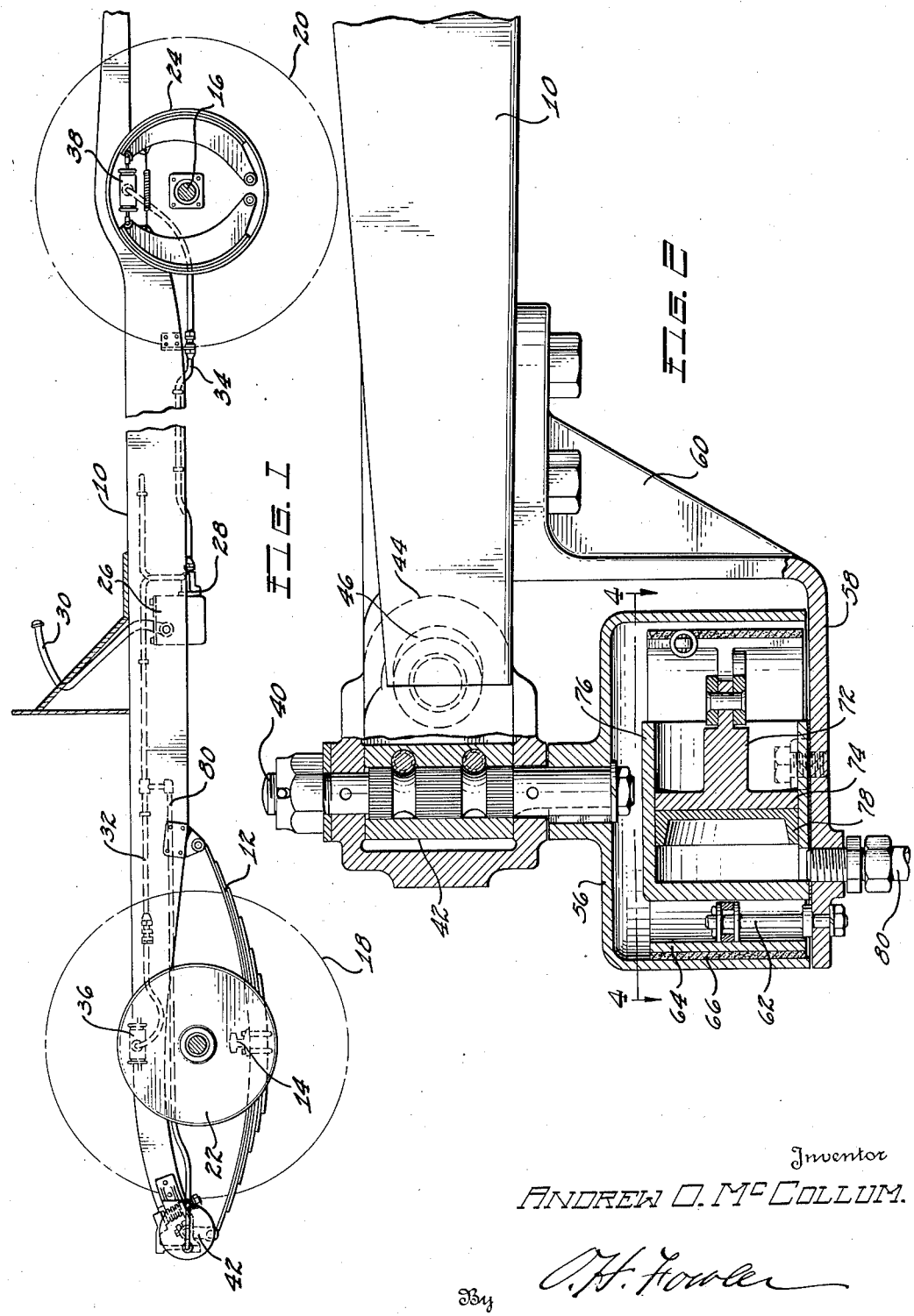
Inventor
ANDREW O. McCOLLUM.
By O. H. Fowler
Attorney

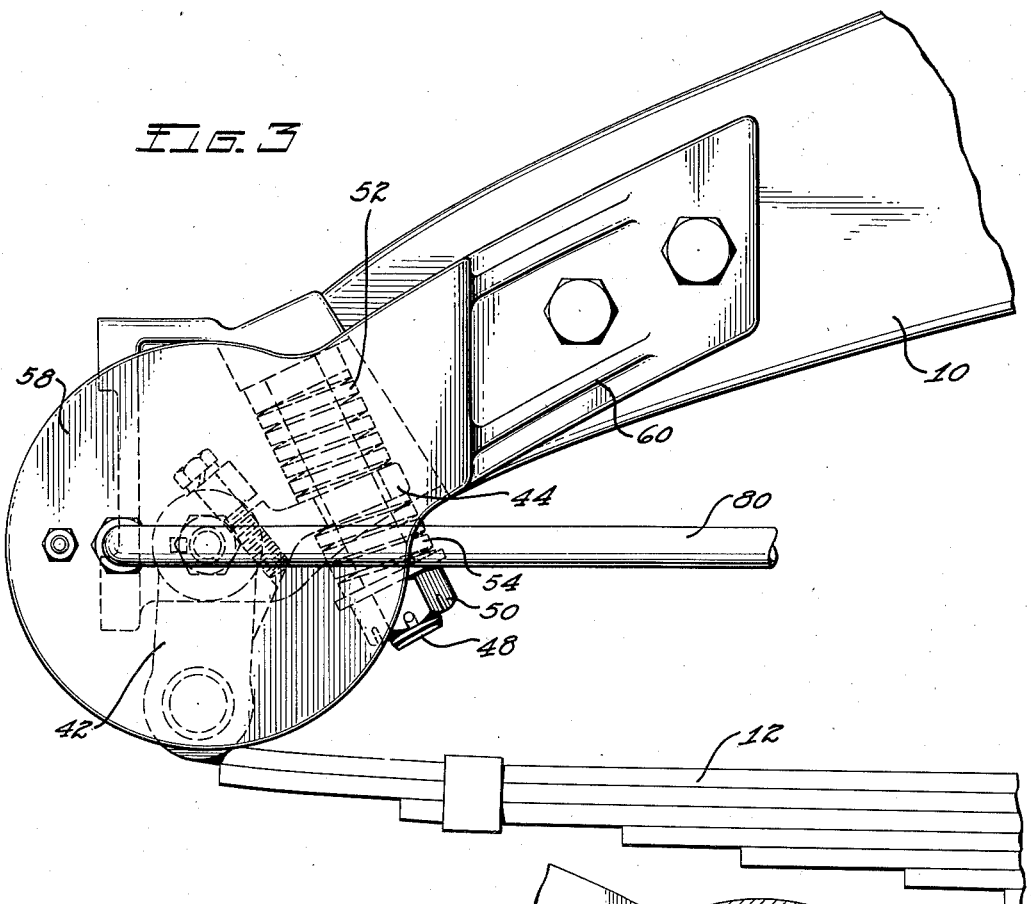
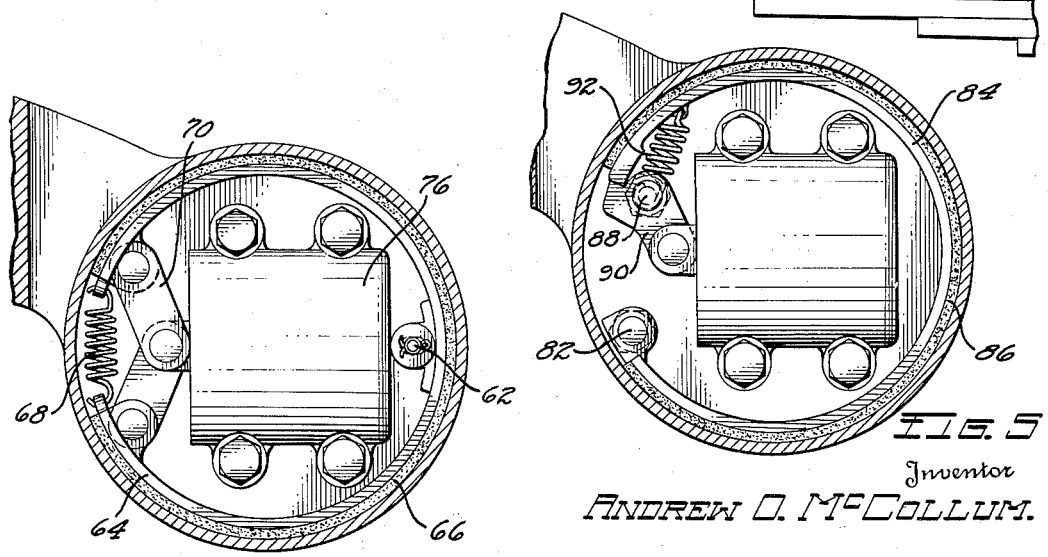

Patented Mar. 20, 1934

1,951,702

UNITED STATES PATENT OFFICE 1,951,702

CONTROL DEVICE

Andrew O. McCollum, Detroit, Mich., assignor to Hydraulic Brake Company, Detroit, Mich., a corporation of California Application November 25, 1932, Serial No. 644,363

5 Claims. (Cl. 188—130)

This invention relates to control devices for motor vehicles and more particularly to control devices for shimmy eliminators for motor vehicles.

Broadly the invention comprehends means for controlling a shimmy eliminator such as are now in use on motor vehicles. Generally shimmy eliminators include a modification of the conventional spring suspension comprising a yieldingly trunnion bracket on the chassis frame of the vehicle, to which the rear end of one of the front springs of the vehicle is attached, or a modification of the conventional shackle by which the forward end of one of the front springs is attached to the frame including means for yieldingly retaining the shackle in position.

These devices have been applied to many motor vehicles with some success in the elimination of vibrations known in the industry as shimmy, wheel tramp, wheel wobble, steering wheel kick, and so forth. However, such devices have not proved entirely satisfactory because motor vehicles equipped with devices of this type invariably duck to one side of the road on heavy brake application. This is due to a relative movement between the frame and the axle caused by flexure of the spring and the yieldability of the means connecting the spring to the frame.

The present invention aims to overcome this extremely serious and dangerous condition by providing a control means for the spring suspension including means for locking the spring suspension against movement. The control means operates simultaneously with application of the brakes of the vehicle.

An object of the invention is to provide a control means for a shimmy eliminator.

Another object of the invention is to provide a control means for a shimmy eliminator including a brake for a spring suspension member.

Another object of the invention is to provide a control means for a shimmy eliminator including means for effectively securing a spring suspension member against movement.

A further object of the invention is to provide a control means for a shimmy eliminator including a brake for a spring suspension member and means for hydraulically operating the brake.

Yet a further object of the invention is to provide an attachment for a motor vehicle equipped with a hydraulically operated braking system and a shimmy eliminator, whereby the shimmy eliminator may be locked against movement simultaneously with the application of the brakes of the vehicle so that undesirable relative movement between the chassis frame and the axle of the vehicle may be avoided.

Other objects and advantages of the invention will more fully appear from the following description taken in connection with the accompanying drawings forming a part of this specification and, in which,—

Figure 1 is a side elevation of a motor vehicle chassis illustrating the invention as applied.

Figure 2 is an enlarged top plan view of one of the forks of the frame of the chassis showing the invention as applied, part being shown in section.

Figure 3 is an enlarged side elevation of one of the forks of the chassis frame, the spring supporting the frame, and the device supported by the frame and coupled to the shackle.

Figure 4 is a vertical sectional view illustrating the friction element; and

Figure 5 is a modification of the friction element.

Referring to the drawings for more specific details of the invention, 10 represents a side rail of a motor vehicle chassis. It is, of course, to be understood that there are two rails arranged in parallel relation and connected by suitable cross bars and braces, not shown.

The frame is supported by springs 12, only one of which is shown, suspended from a front axle 14 and a rear axle 16. The axles have positioned thereon for rotation wheels 18 and 20 which may be of any desired type, and associated with the wheels are front brakes 22 and rear brakes 24, preferably of the hydraulically operated type.

As shown, a supply tank 26 suitably supported on the frame has enclosed therein a master cylinder 28 actuated through a foot pedal lever 30. The master cylinder is connected by pipe lines 32 and 34 to suitable brake actuating cylinders 36 and 38. These cylinders may be of any desired type. They are so positioned between the friction elements of the brakes to spread these elements into drum engagement. The structure thus far described is well known in the art, and forms no part of the present invention.

One of the forks on the frame 10 carries a rotatable shackle bolt 40 to which is keyed one end of a shackle 42, the other end of which is pivotally secured to the eye of the spring 12. The shackle is provided with an arm 44 which extends beneath the fork to which the shackle is attached. As shown, the arm 44 has an opening 46 for the reception of a bolt 48 suitably secured to the fork. The bolt 48 has sleeved thereon, between the arm 44 and the fork and between the arm 44 and a nut 50 threaded on the end of the bolt, short spring sections 52 and 54. These springs effectively damp vibrations due to wheel shimmy, wheel tramp, wheel wobble, and so forth. This structure has not proved entirely satisfactory since upon heavy braking the vehicle ducks to one side due to the flexing of the springs 12 and the yieldability of the connection between the spring 12 and the fork of the frame.

It has been found that in order to overcome this objection it is desirable to devise some means for securing the shackle connecting the spring to the frame against movement, and to that end the shackle pin 40 has keyed or otherwise secured thereto a drum 56. The drum has associated therewith a backing plate 58 supported by a suitable bracket 60 bolted or otherwise secured to the fork.

The backing plate has positioned thereon an anchor 62 supporting a friction element 64. As shown, the friction element comprises a split band having suitably secured thereto friction lining 66, adaptable for cooperation with the braking surface of the drum. The free ends of the friction element 64 are connected by a spring 68 for returning the friction element to the off position, and by a toggle 70 for spreading the band into drum engagement. The knee of the toggle is connected to a piston rod 72 formed integral with a piston 74, positioned for reciprocation in a cylinder 76 suitably secured to the backing plate. As shown, the piston is provided with a suitable leak-proof cup 78.

Leading from the cylinder 76 is a pipe line 80 connected in one of the pipe lines 32 leading from the master cylinder 28 to one of the actuating cylinders 36. The type of brake structure herein described is known in the art as a half-wrapping brake. It differs from brake structures of this type in that the actuating cylinder 76 is materially larger, so that when actuated it substantially locks the brake against movement and thus effectively secures the shackle against displacement.

A modification of the invention is illustrated in Figure 5 wherein use is made of a full wrapping brake. In this structure an anchor 82 positioned on the backing plate has pivoted thereto one end of a band 84 to which is suitably secured friction lining 86 adaptable for cooperation with the braking surface of the drum. The backing plate supports a stud 88 to which is pivotally secured a rocking lever 90. One end of the lever engages the free end of the band 84 and the other end of the lever is pivoted to the piston rod, and connected between the pin 88 and the friction element or band 84 is a spring 92 for returning the band to its normal position upon release of the applied force.

In both the preferred form and in the modification of the invention, upon application of the brakes associated with the wheels, by actuation of the master cylinder the brake on the shackle pin is simultaneously actuated to lock the shackle against movement and thereby effectively prevent excessive relative movement between the frame and the axle of the vehicle due to flexing of the spring and yieldability of the shackle.

Although the invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention what I claim is new and desire to secure by Letters Patent is:

1. A control device for a motor vehicle having brakes, fluid pressure means for operating the brakes, and a vibration damper having a movable member, a brake for the movable member, and means connecting the brake to the fluid pressure means for operating the vehicle brake.

2. A control device for a motor vehicle having brakes, fluid pressure means for operating the brakes, and a vibration damper having a rotatable part, a brake on the rotatable part, and means connecting the brake on the rotatable part to the fluid pressure means for actuating the vehicle brake for simultaneous operation.

3. A control device for a motor vehicle having brakes, means for operating the brakes, and a vibration damper having a movable part, a brake on the movable part, and means connecting the brake on the part to the means for actuating the vehicle brakes for simultaneous operation.

4. A control device for a motor vehicle having brakes associated with the wheels of the vehicle, fluid pressure means for operating the brakes associated with the wheels of the vehicle, and a vibration damper connected between the frame and one of the springs of the vehicle and having a movable part, a brake on the movable part, and fluid pressure means connecting the brake on the movable part with the fluid pressure means for actuating the brakes associated with the wheels of the vehicle.

5. A control device for a motor vehicle having brakes associated with the wheels thereof, fluid pressure means for operating the brakes associated with the wheels, and a vibration damper connected between the frame and one of the springs of the vehicle having a rotatable part, a brake on the rotatable part, and means for actuating the brake on the rotatable part connected to the means for actuating the brakes associated with the wheels for concomitant operation.

ANDREW O. McCOLLUM.